United States Patent [19]
Shelton

[11] Patent Number: 5,318,356
[45] Date of Patent: Jun. 7, 1994

[54] CHARGER/SHELTER APPARATUS FOR ELECTRIC SHAVER

[76] Inventor: J. Calvin Shelton, 4044 Remington Dr., Redding, Calif. 96001

[21] Appl. No.: 950,638

[22] Filed: Sep. 22, 1992

[51] Int. Cl.⁵ .............................................. H05K 5/03
[52] U.S. Cl. .................................. 312/223.1; 30/90; 174/52.1; 248/314; D6/526
[58] Field of Search ............... 312/223.1; 174/52.1, 174/50; 248/314, 912; 30/90; D6/526

[56] References Cited

U.S. PATENT DOCUMENTS

| | | |
|---|---|---|
| D. 123,488 | 11/1940 | Remy . |
| D. 145,084 | 6/1946 | Hutt et al. . |
| D. 175,001 | 6/1955 | Young . |
| 2,181,065 | 11/1939 | Pfeiffer et al. . |
| 2,471,825 | 5/1949 | Long . |
| 2,474,899 | 7/1949 | Hutt . |
| 2,821,453 | 1/1958 | Jessen .................... 312/223.1 |
| 2,845,245 | 7/1958 | Gray et al. . |
| 2,982,593 | 5/1961 | Chambers ................ 312/223.1 |
| 3,279,871 | 10/1966 | Bright .................... 312/223.1 |
| 4,275,862 | 6/1981 | Takagi et al. . |

Primary Examiner—Joseph M. Gorski
Attorney, Agent, or Firm—John P. O'Banion

[57] ABSTRACT

An apparatus for hanging a rechargeable electric shaver (24) on a wall or door of a cabinet during recharging and other periods of non-use. The apparatus includes a receptacle (22) into which the lower end of the electric shaver (24) is inserted and supported in a generally vertical orientation, and further includes a hood (20) which covers the shaving head portion (40) of the electric shaver (24) in order to protect the shaving head from dirt, dust, water or damage. The receptacle (22) may include a battery charging unit for charging electric shavers which do not have built-in chargers.

13 Claims, 2 Drawing Sheets

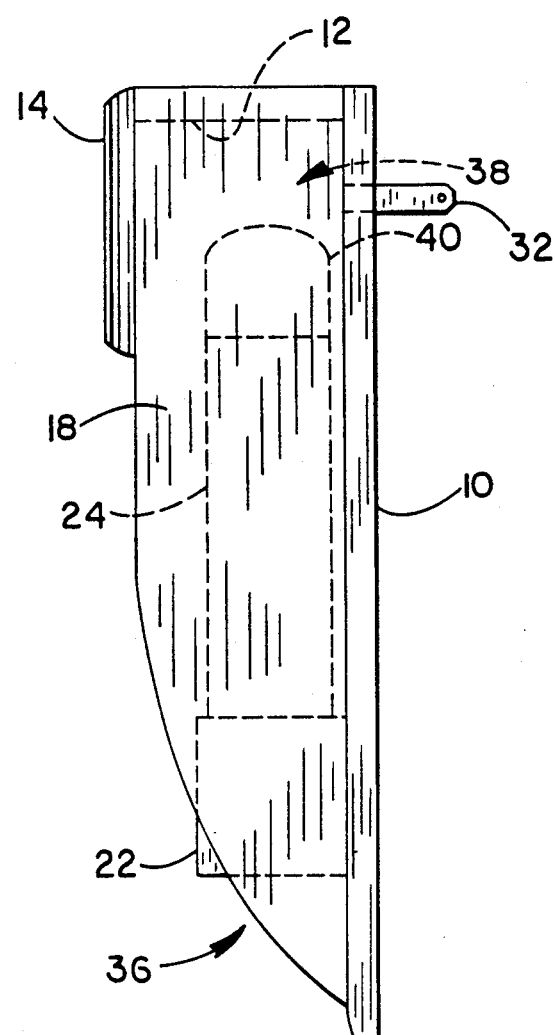
FIG.—2
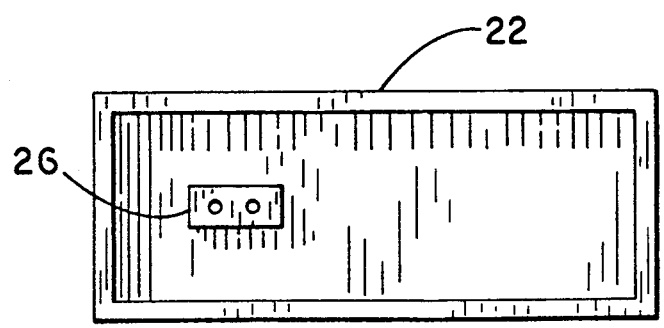
FIG.—3

CHARGER/SHELTER APPARATUS FOR ELECTRIC SHAVER

BACKGROUND OF THE INVENTION

1. Field of the Invention

This invention pertains generally to storage of electric shavers and, more particularly, to a wall-mounted device for conveniently holding and charging rechargeable electric shavers.

2. Description of the Background Art

Electric shavers are commonly used on a daily basis as an alternative to a blade razor. The inconvenience of having to make a connection to a source of electrical power during use of an electric shaver, however, has resulted in the development of rechargeable shavers. Still, rechargeable shavers must periodically be connected to a source of electrical power in order to maintain a charge level sufficient for proper operation.

Generally, when a rechargeable shaver is not being used it is stored in a drawer. During the recharging cycle, however, the shaver must be connected to a source of electrical power. For shavers with built-in chargers, the connection is made directly to a wall outlet. For shavers with external chargers, the shaver is typically inserted into a charging stand. In either case, the shaver is generally placed on a countertop or shelf during recharging. Not only does this add to clutter and unsightliness, but there is a risk of the shaver falling onto the floor thereby damaging the shaver. Also, the power connecting cord can become entangled in a drawer or knob in a vanity or pullman on which the shaver is placed. And, the shaver could fall into a sink or bathtub while recharging and cause serious injury to a person.

Various wall-mounted holder devices for electric shavers have been heretofore developed. For example, U.S Pat. No. 2,474,899 issued to Hutt on Jul. 5, 1949, discloses a wall mounted shaver holder that is connected to a source of electricity that allows for convenient plug in use. A spring loaded switch automatically turns the power on when the shaver is removed, and off when the shaver is returned to the receptacle. U.S. Pat. No. 2,471,825 issued to Long on May 31, 1949, discloses a wall mounted holder with a receptacle for an electric razor, a notch for holding the cord, and a notch for holding a cleaning brush. U.S. Pat. No. 2,181,065 issued to Pfeiffer et al. on Nov. 21, 1939, discloses an electric shaver holder which has a receptacle for the razor as well as supports around which the cord can be wrapped. A hinged door covers the enclosure when not in use. U.S. Pat. No. 2,845,245 issued to Gray et al. on Jul. 29, 1958, discloses a wall holder for an electric shaver in which curved projecting side arms hold the shaver in position and interior disposed ribs adapt the holder to shavers of different sizes. U.S. Pat. No. 4,275,862 issued to Takagi et al. on Jun. 30, 1981, discloses a wall mounted electric shaver holder that folds flat against the wall when not in use. U.S. Pat. No. Des. 123,488 issued to Remy on Nov. 12, 1940, discloses a wall mounted holder for an electric razor which has a pedestal base and a domed shape cover. U.S. Pat. No. Des. 175,001 issued to Young on Jun. 21, 1955, discloses an electric shaver holder having a cupped receptacle and a rounded face plate. U.S. Pat. No. Des. 145,084 issued to Hutt on Jun. 25, 1946, discloses a wall mounted electric shaver holder of an oblong design.

None of the foregoing patents, however, discloses a wall mounted electric shaver holder which can be used to house and charge an electric shaver. Therefore, a need exists for a holder which can charge an electric shaver in addition to supporting the shaver against a wall to free a countertop or shelf from clutter. The present invention fills that need.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

In general terms, the present invention comprises a "shelter/charger" for a rechargeable electric shaver. The apparatus includes a back panel which is configured and structured for mounting to a wall or other flat vertical surface such as the inside of a cabinet door. A charging unit is affixed to the lower portion of the back panel, and includes a receptacle into which the charging end—that is, the end of an electric shaver opposite the shaving head, can be inserted. In this manner, the electric shaver is supported in place in a vertical (shaving head up) orientation.

A hood extends outward from the upper portion of the back panel to cover and shelter the shaving head portion of the electric shaver from contamination from dust, dirt and the like. A pair of side panels extend outward from the back panel to shield the sides of the electric shaver, as well as to provide additional support for the hood.

The charging unit includes an electrical connector for mating with the electric shaver. In one embodiment, a power cord extends from the charging unit for connection to an electrical outlet on the wall or other power source. In another embodiment, a male connector extends from the back surface of the back panel for directly coupling the apparatus to the power source, in which case the apparatus would cover all or a portion of the wall outlet. For electric shavers of the type which do not have built-in rechargers, the charging unit includes appropriate electric circuitry to provide for charging the electric shaver.

An object of the invention is to provide a wall-mounted holder for electric shavers.

Another object of the invention is to provide a wall-mounted charging apparatus for electric shavers.

Another object of the invention is to reduce clutter and cord entanglement caused by storage of an electric shaver on a countertop.

Another object of the invention is to provide a permanent location for storage of an electric shaver.

Another object of the invention is to shelter an electric shaver from dust and damage.

Another object of the invention is to ensure that a rechargeable electric shaver is fully charged and ready for use at all times.

Another object of the invention is to provide a wall-mounted holder for electric shavers which is easy to use.

Another object of the invention is to provide for a stable and safe holder for an electric shaver.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 2 is a side elevation view of the apparatus shown in FIG. 1.

FIG. 3 is a top plan view of the charging receptacle portion of the apparatus shown in FIG. 1.

DESCRIPTION OF THE PREFERRED EMBODIMENTS

Figure 1:
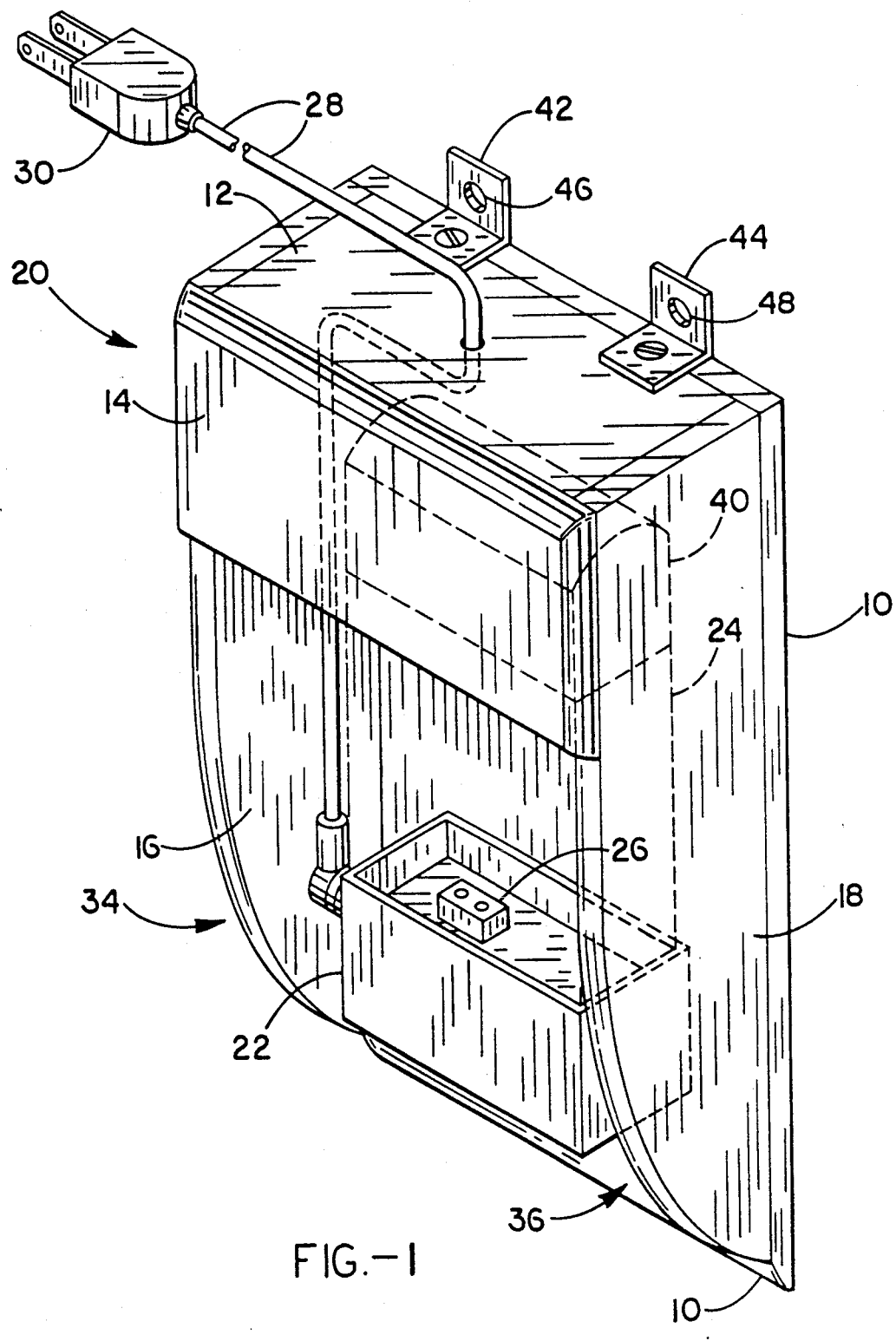
FIG. 1 is a perspective view of the apparatus of the present invention.

Referring more specifically to the drawings, for illustrative purposes the present invention is embodied in the apparatus generally shown in FIG. 1. It will be appreciated that the apparatus may vary as to configuration and as to details of the parts without departing from the basic concepts as disclosed herein.

Referring to FIG. 1, an electric shaver "shelter/-charger" in accordance with the present invention includes a back panel 10 which is generally planar so that it can be attached to a wall or other generally flat surface. While it is preferred that back panel 10 be of a generally rectangular configuration having upper and lower ends and a pair of side edges, those skilled in the art will appreciate that other shapes and configurations could be used.

A top panel 12 projects outward from the upper end of back panel 10 in an orientation which is generally perpendicular to back panel 10. A face panel 14 projects downward from top panel 12 in an orientation which is generally perpendicular to top panel 12 and generally parallel to back panel 10. A pair of opposing side panels 16, 18 project outward from back panel 10 in an orientation which is generally perpendicular to back panel 10, and extend from the upper end of back panel 10 toward the lower end of back panel 10. Each of the side panels 16, 18 has an upper end which is joined to top panel 12, as well as an outer edge which is joined to face panel 14. As can be seen, the configuration of top panel 12 and face panel 14 forms a hood 20 which projects outward from the upper end of back panel 10 and which is bounded by side panels 16, 18. In addition, an open cavity is formed between hood 20 and the lower end of back panel 10 in which an electric shaver can be inserted.

Referring also to FIG. 2 and FIG. 3, a charging receptacle 22 is attached to back panel 10 below hood 20 and near the lower end of back panel 10. Charging receptacle 22 is configured and structured for placement of an electric shaver 24 therein such that the electric shaver 24 is supported in a vertical orientation. Charging receptacle 22 includes a charger connector 26 which mates with a corresponding electrical connector on electric shaver 24 and provides a source of electrical power to recharge batteries in electric shaver 24. Those skilled in the art will appreciate that the configuration of charger connector 26 will vary depending upon the configuration of the connector in electric shaver 24.

To connect charger connector 26 to a source of power, one end of a power cord 28 is electrically coupled to electrical connector 26 while the other end of power cord 28 is attached to a conventional power cord plug 30 for connection to a wall outlet or the like. This configuration is preferred where the power source is remote from the location where the apparatus will be mounted. In this configuration, power cord 28 preferably extends through the center of top panel 12 so that cord plug 30 can conveniently be connected to a wall outlet on either side of the apparatus. Alternatively, where a wall outlet is in a convenient location, cord plug 30 is eliminated and, instead, a dual-prong male-type power connector 32 can be coupled to power cord 28 and affixed to back panel 10 such that it extends through the rear surface of back panel 10. In this manner, the apparatus can be plugged directly into a wall outlet or the like.

For an electric shaver 24 which does not include a built-in battery charger, charging receptacle 22 includes conventional battery charger circuitry which is connected between charger connector 26 and power cord 28.

Referring now to FIG. 1 and FIG. 2, it will be seen that side panels 16, 18 have arcuate lower ends 34, 36, respectively, which are positioned in proximity to charging receptacle 22 for ease of access to electric shaver 24 when placed in charging receptacle 22. It can also be seen that a cavity 38 is formed in the area below top panel 12 and between face panel 14, back panel 10, and side panels 16, 18. In order that shaver head 40 is protected from the accumulation of dirt or dust, and to prevent damage to shaver head 40, charging receptacle 22 is positioned on back panel 10 so that shaver head 40 will extend into cavity 38 when electric shaver 24 is placed into charging receptacle 22. In this manner, hood 20 covers and protects shaver head 40. Note also that the convexly arcuate lower ends 34, 36 of side panels 16, 18 provide the advantage of permitting the user to easily slide his or her fingers into the area surrounding cavity 38 to grasp and remove (or replace) electric shaver 24 without breaking a fingernail or bumping the knuckles of the hand.

Back panel 10 can be attached to a wall or other flat surface by means of mounting brackets 42, 44 which extend from top panel 12 near the upper end of back panel 10. Nails, screws or the like can be driven through holes 46, 48 for secure attachment. Alternatively, holes or notches (not shown) can be placed in back panel 10 so that back panel 10 can be hung on a screw, nail, picture hanger or the like. And, where the apparatus is to be coupled directly to a wall outlet using power connector 32, power connector 32 may provide sufficient mounting support for the apparatus.

Those skilled in the art will appreciate that the apparatus can be fashioned from plastic, wood or the like, and that the apparatus can take on various shapes and sizes without departing from the concepts and structure disclosed herein.

Accordingly, it will be seen that this invention provides for the storage of a rechargeable electric shaver in a convenient and easy to use manner, as well as ensuring that the shaver is fully charged and ready for use at all times. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A wall-mounted holder for a rechargeable electric shaver, comprising:
   (a) a back panel having upper and lower ends;
   (b) a hood, said hood projecting outward from said upper end of said back panel;
   (c) charging receptacle means for receiving and charging an electric shaver, said charging receptacle means coupled to said back panel near said lower end of said back panel;
   (d) interconnect means for electrically coupling said charging receptacle means to a source of electrical power; and
   (e) a pair of opposing side panels, said side panels projecting outward from said back panel, each of said side panels joined to and extending downward from said hood toward said lower end of said back panel, each of said side panels having a convexly arcuate taper toward said lower end of said back panel, said side panels and said back panel defining an open cavity between said hood and said lower end of said back panel.

2. An apparatus as recited in claim 1, wherein said hood comprises:
   (a) a top panel, said top panel projecting outward from said back panel in a generally perpendicular orientation in relation to said back panel; and
   (b) a face panel, said face panel projecting downward from said top panel in a generally perpendicular orientation in relation to said top panel and in a generally parallel orientation in relation to said back panel.

3. An apparatus as recited in claim 2, further comprising means for mounting said back panel to a generally planar surface.

4. An apparatus as recited in claim 3, wherein said interconnect means comprises a cable having first and second ends, said first end coupled to said charging receptacle means, said second end coupled to an alternating current electrical plug.

5. An apparatus as recited in claim 3, wherein said interconnect means comprises a cable having first and second ends, said first end coupled to said charging receptacle means, said second end coupled to a an alternating current electric plug said, electrical plug affixed to and extending through said back panel.

6. An apparatus for supporting and charging an electric shaver, comprising:
   (a) a back panel having upper and lower ends;
   (b) a pair of opposing side panels, each of said side panels extending from said upper end of said back panel toward said lower end of said back panel, each of said side panels projecting outward from said back panel in a generally perpendicular orientation in relation to said back panel;
   (c) a hood, said hood projecting outward from said upper end of said back panel, each of said side panels joined to and extending downward from said hood toward said lower end of said back panel, each of said side panels having a convexly arcuate taper toward said lower end of said back panel, said side panels and said back panel defining an open cavity between said hood and said lower end of said back panel;
   (d) charging receptacle means for supporting an electric shaver and coupling said electric shaver to a source of electric power for recharging, said charging receptacle means coupled to said back panel; and
   (e) interconnect means for electrically coupling said charging receptacle means to a source of electrical power.

7. An apparatus as recited in claim 6, wherein said hood comprises:
   (a) a top panel, said top panel projecting outward from said back panel in a generally perpendicular orientation in relation to said back panel, said top panel joined to each of said side panels; and
   (b) a face panel, said face panel projecting downward from said top panel in a generally perpendicular orientation in relation to said top panel and in a generally parallel orientation in relation to said back panel, said face panel joined to each of said side panels.

8. An apparatus as recited in claim 6, wherein said interconnect means comprises a cable having first and second ends, said first end coupled to said charging receptacle means, said second end coupled to a an alternating current electrical plug.

9. An apparatus as recited in claim 6, wherein said interconnect means comprises a cable having first and second ends, said first end coupled to said charging receptacle means, said second end coupled to an alternating current electrical plug said, electrical plug affixed to and extending through said back panel.

10. An apparatus for storing and charging an electric shaver, comprising:
    (a) a back panel, said back panel having an upper and lower edge, said back panel having a pair of side edges;
    (b) a top panel, said top panel projecting outward from said upper edge of said back panel;
    (c) a face panel, said face panel projecting downward from said top panel;
    (d) a pair of opposing side panels, each of said side panels projecting outward from said side edges of said back panel, each of said side panels having an end coupled to said top panel, each of said side panels having a convexly arcuate taper toward said lower edge of said back panel, said side panels and said back panel defining an open cavity between said face panel and said lower end of said back panel;
    (e) a receptacle, said receptacle configured and structured for receiving an end of an electric shaver, said receptacle attached to said back panel below said face panel;
    (f) first electrical connector means for electrically coupling said receptacle to a source of electrical power; and
    (g) second electrical connector means for coupling said first electrical connector means to said electric shaver, whereby said electric shaver is recharged when placed in said receptacle and the shaving head of said electric shaver extends into a cavity formed by said top panel and said face panel.

11. An apparatus as recited in claim 10, further comprising battery charging means for charging a battery in said electric shaver, said battery charging means disposed between said first electrical connector means and said second electrical connector means.

12. An apparatus as recited in claim 10, wherein said first electrical connector means comprises a cable having first and second ends, said first end coupled to said second electrical connector means, said second end coupled to an alternating current electrical plug.

13. An apparatus as recited in claim 10, wherein said interconnect means comprises a cable having first and second ends, said first end coupled to said charging receptacle means, said second end coupled to an alternating current electric plug said, electrical plug affixed to and extending through said back panel.

* * * * *